July 14, 1953
F. G. PEARCE
2,645,655
RECOVERY AND PURIFICATION OF OIL
SOLUBLE OXYGENATED COMPOUNDS
Filed Jan. 24, 1950
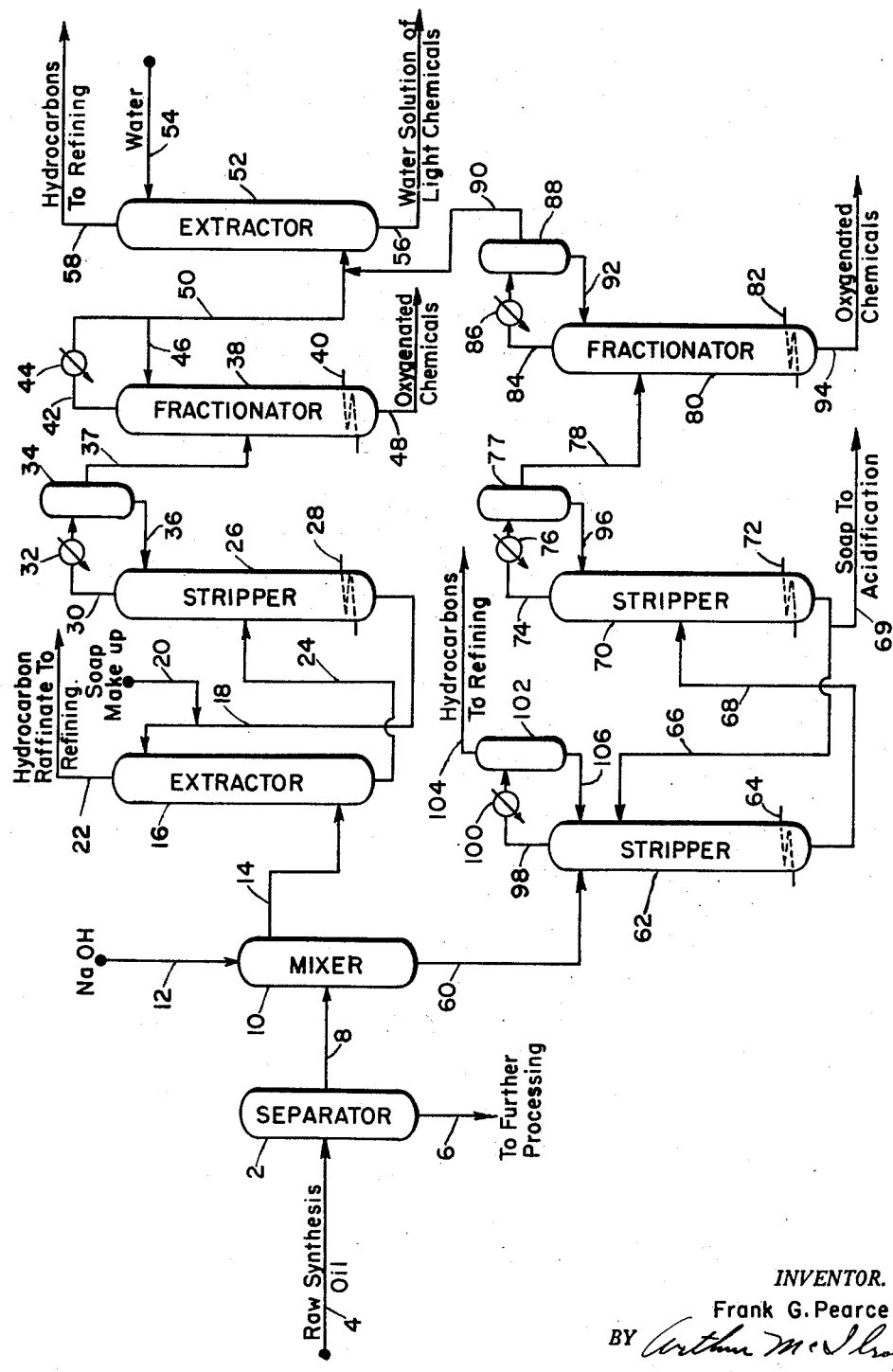
INVENTOR.
Frank G. Pearce
BY
Attorney Patented July 14, 1953

2,645,655

UNITED STATES PATENT OFFICE 2,645,655

RECOVERY AND PURIFICATION OF OIL SOLUBLE OXYGENATED COMPOUNDS

Frank G. Pearce, Tulsa, Okla., assignor to Stanolind Oil and Gas Company, Tulsa, Okla., a corporation of Delaware Application January 24, 1950, Serial No. 140,249

8 Claims. (Cl. 260—450)

The present invention relates to a novel method for the recovery of various oxygenated organic chemicals from hydrocarbon solutions thereof. More particularly, it pertains to a process for the recovery of such chemicals from crude hydrocarbon mixtures thereof by subjecting said mixtures to extraction with one or more types of carboxylic acid salt solutions hereinafter defined.

While the principles taught herein find application in the recovery of chemicals from numerous kinds of crude hydrocarbon mixtures, the present description deals particularly with the problems encountered in recovering valuable chemicals from the oil stream produced by the hydrogenation of carbon monoxide in the presence of a fluidized alkali-promoted iron catalyst under known synthesis conditions. This oil fraction obtained in the hydrocarbon synthesis process, contains a rather wide variety of acids, carbonyl compounds (ketones and aldehydes), and alcohols together with a smaller proportion of esters. For example, in hydrocarbon synthesis plants designed to produce approximately 650,000 lbs. per day of liquid hydrocarbons, there are simultaneously produced along with this oil fraction 76,000 lbs. of oil soluble carbonyl compounds, 61,700 lbs. of oil soluble alcohols, and 69,300 lbs. of oil soluble acids. Because of their value as chemicals, it is desirable to separate these compounds from the oil stream as completely as possible. Also in the subsequent conversion of the aforesaid oil fraction into gasoline, it is imperative that such compounds either be removed from the oil or converted into substances such as, for example, unsaturated hydrocarbons, which can then be utilized in conjunction with the hydrocarbons originally synthesized to make high quality motor fuels.

Because of the close proximity in boiling points of these various oil soluble chemicals to the hydrocarbons constituting the oil fraction, separation of chemicals from hydrocarbons by normal fractional distillation methods is a practical impossibility. Normally, in the recovery of chemicals from the oil stream, the raw primary synthesis oil, as it comes from the separating unit, is treated with sufficient caustic to neutralize the acids present. There result two layers, a neutral oil layer containing the bulk of the non-acid oil soluble chemicals and a lower aqueous layer containing the acids in the form of their corresponding salts together with an appreciable percentage, i. e., approximately 25 weight per cent of non-acid chemicals which have been solubilized thereby and from about 10 to 20 weight per cent of hydrocarbons, depending, of course, on the strength of the caustic initially added. While recovery of the acids from the aforesaid aqueous layer can be accomplished without substantial difficulty, the solubilized chemicals and hydrocarbons present a rather formidable problem, especially where it is desired to effect a substantially complete separation of chemicals from hydrocarbons. Further extraction of the neutral oil layer with soap solutions formerly used, i. e., high molecular weight soaps or solutions of soaps derived from neutralizing the entire acid component of the hydrocarbon synthesis oil, failed to result in satisfactory separation of chemicals from the oil. Thus, in extracting the neutral oil containing non-acid chemicals with such soap solutions, an extract was obtained which, on distillation followed by topping the resulting distillate to about 100° C., did not give a satisfactory separation of hydrocarbons from chemicals. In this procedure, the first distillate secured contained from about 10 to 12 weight per cent hydrocarbons together with essentially all of the non-acid chemicals and when such distillate was topped to about 100° C., there was obtained an overhead amounting to about 25 to 30 weight per cent of the feed which contained only about 40 weight per cent of the hydrocarbons in the feed. While some concentration of hydrocarbons in the light ends was effected, the hydrocarbon content of the fraction boiling above 100° C. (bottoms) was too high to permit recovery of chemicals in a form sufficiently free from hydrocarbons to satisfy average industrial specifications. Moreover, in the distillation of non-acid chemicals from total soap mixtures, foaming frequently becomes so excessive that further separation of the chemicals from the extract is impossible.

Accordingly, it is an object of my invention to effect recovery of these chemicals from crude hydrocarbon mixtures thereof by subjecting said mixtures to extraction with a particular type of salt solution prepared from a selected range of carboxylic acids. It is a further object of my invention to provide a method for recovering solubilized non-acid chemicals present in the soap mixtures produced during neutralization of the raw hydrocarbon synthesis oil by subjecting such soap mixtures to a series of stripping operations and thereafter contacting the resulting enriched chemical fraction containing a reduced concentration of hydrocarbons with the aforesaid salt solution prepared from a selected range of carboxylic acids. It is a still further object of my invention to provide a process by which separation of the desired non-acid chemicals from the soap extract can be effected in the absence of foaming.

The expression "total soap" appearing in the present description, as well as in certain of the appended claims, is intended to refer to the mixture of soaps prepared by neutralizing the fatty acids present in the raw primary oil or the equivalent thereof.

I have now discovered that the contaminating hydrocarbons in chemicals extracted from hydrocarbon solutions or mixtures of the type contemplated herein can be substantially completely separated from the chemicals by first extracting a hydrocarbon solution of non-acid chemicals with a solution of selected aliphatic carboxylic acid salts derived from mixed acids having, preferably, from 2 to 6 carbon atoms. The extract thus obtained is first stripped to effect a separation of the solvent from the extracted chemicals together with from about 10 to 12 weight per cent hydrocarbons. This distillate is next subjected to fractional distillation up to a temperature of from about 90° to about 110° C., preferably from about 100° to 105° C. On analysis of the overhead and bottoms fractions obtained in this manner, it is found that substantially all of the remaining hydrocarbons have been taken overhead with entrainment of only a small percentage of low boiling chemicals, while the major chemical fraction is recovered as bottoms substantially free from hydrocarbons. By the utilization of a salt extractant having the restricted composition generally set forth above, it is possible to obtain fractions of oil soluble chemicals of greatly decreased hydrocarbon content. Furthermore, the foam problem encountered in the stripping of oil soluble chemicals from the salt extract is eliminated.

In carrying out the process of my invention, the concentrations of selected salt solutions may vary widely; however, in general, I have found that concentrations ranging from about 20 to 50 weight per cent, and preferably 30 to 40 weight per cent, are satisfactory. The composition of the selected salt fraction employed likewise may vary and for the majority of instances solvents prepared from salt mixtures derived from mixed acids having an average molecular weight of from about 85 to 115, preferably from about 95 to 105, are generally suitable. The desired fraction of $C_2$ to $C_6$ salts may be obtained in any conventional manner. For example, the corresponding acid fraction may be secured by first acidifying a salt solution formed by completely neutralizing raw primary synthesis oil to liberate the fatty acids, washing therefrom free mineral acid and salt formed during the acidification step, and thereafter distilling the resulting mixture of washed acids up to a temperature of about 210° C. (760 mm.). The distillate thus obtained may then be neutralized by the addition of a substantially stoichiometric quantity of a suitable base to yield the desired $C_2$ to $C_6$ salt fraction which may then be diluted with water to the required concentration. As examples of bases suitable for use in the formation of these salts, there may be mentioned ammonium hydroxide, ammonium carbonate, and the various hydroxides and carbonates of the alkali metals, all of which for the purpose of this description are referred to as "alkali metal hydroxides or carbonates."

For a better understanding of my invention, reference is made to the accompanying flow diagram in which raw primary oil from a conventional hydrocarbon synthesis reactor is introduced into separator 2 through line 4 where the primary water stream is withdrawn for further processing through line 6. The upper oil layer is withdrawn through line 8 and introduced into neutralizing or mixing vessel 10. The acids contained in the raw oil are thereafter neutralized by the addition of caustic, preferably in the form of a 10 to 15 weight per cent aqueous solution, through line 12 after which the neutral oil layer containing the non-acid oil soluble chemicals is withdrawn through line 14 and countercurrently contacted in extractor 16, preferably with a 30 to 35 weight per cent aqueous solution of a selected $C_2$ to $C_6$ salt fraction composed of acids having an average molecular weight of about 100 introduced through line 18. Make-up extraction solvent may be added through line 20. Hydrocarbon raffinate from extractor 16 is withdrawn through line 22 and subjected to further refining operations outside the scope of this invention. The rich salt extract thus obtained is withdrawn from the bottom of extractor 16 and sent through line 24 to stripping tower 26 equipped with reboiler 28. During the operation of stripper 26, a bottoms of lean $C_2$ to $C_6$ salts is recycled to extractor 16 through line 18 while an overhead stream consisting essentially of hydrocarbons and oil soluble chemicals together with some water is withdrawn through line 30 and condenser 32 and permitted to stratify into two layers in settling tank 34 after which the water layer is returned as reflux through line 36 and the upper oil layer containing hydrocarbons and chemicals transferred through line 37 to column 38 equipped with reboiler 40. The feed introduced into fractionating column 38 is preferably topped at 105° C., the overhead being withdrawn through line 42 and condenser 44, a portion thereof being recycled through line 46 as reflux. The bottoms fraction obtained under these conditions is withdrawn through line 48 and consists essentially of substantially hydrocarbon-free oil soluble chemicals which may then be sent to a suitable system capable of separating these chemicals into their respective classes. The bulk of the overhead from column 38 contains hydrocarbons together with a small amount of low boiling chemicals and this fraction is introduced through line 50 into extractor 52 where it is countercurrently extracted with water or other suitable solvents such as, for example, various glycols, Cellosolves, etc., introduced through line 54 to remove the light chemicals through line 56 after which they may be recovered from the extractant by means of ordinary fractional distillation. The volume of extractant introduced through line 54 actually need not be very great inasmuch as the stream introduced into the extractor through line 50 is relatively small. In the majority of instances, when carrying out the above-mentioned extraction operation, the extractant may be introduced preferably at a rate of from about 2 volumes of extractant to 1 volume of feed. Hydrocarbons are withdrawn from the top of extractor 52 through line 58 and sent to further refining. If desired, an extractive distillation operation wtih any of the above-mentioned solvents may be employed to separate the light chemicals from hydrocarbons contained in the overhead from column 38. Compared to the proportion of chemicals present in the lower water layer withdrawn through line 6, the stream coming from extractor 52 through line 56 constitutes a relatively concentrated one and hence, if desired, may be refined separately from the primary water stream. Alternatively, the stream in line 50 may be recycled to the primary oil separator 2 where the water soluble chemicals present in the feed from line 50 are taken up by the water layer while the preferentially oil soluble components thereof are absorbed by the oil layer. The aqueous soap layer (20 to 50 weight per cent total soap) in mixer 10 formed by neutralization of the fatty acids in the raw primary oil contains, as previously mentioned, approximately 25 weight per cent of solubilized chemicals together with 10 to 15 weight per cent of hydrocarbons. This layer is withdrawn through line 60 and is sent to column 62 equipped with reboiler 64 where it is subjected to a stripping operation. During distillation, a lean soap solution having a concentration, preferably from about 30 to 40 weight per cent, is introduced into the column through line 66, whereby chemicals stripped simultaneously with hydrocarbons are selectively absorbed, withdrawn through column 62 through line 68, and introduced into column 70 equipped with reboiler 72 where the resulting stripped lean soap is returned to column 62 through line 66 and the overhead, relatively free of hydrocarbons, is withdrawn through line 74, condenser 76, and permitted to form two layers in tank 77. The oil layer is thereafter withdrawn from tank 77 via line 78 and introduced into column 80 equipped with reboiler 82. A portion of the overhead from column 70 is returned as reflux through line 6. Excess total soap building up in the system may be withdrawn periodically through line 69. Column 80 is operated at a top tower temperature of about 150° C. so that substantially all of the hydrocarbons present in the feed thereto together with a minor quantity of chemicals can be withdrawn through line 84, condenser 86, allowed to stratify in separator 88, and the upper layer recycled to extractor 52 via lines 90 and 50. The lower layer in separator 88 is withdrawn through line 92 and returned to column 80 as reflux. Substantially hydrocarbon-free oxygenated chemicals boiling above 150° C. are obtained through line 94. The overhead from column 62 consists essentially of hydrocarbons together with azeotropic water and is withdrawn through line 98 and condenser 100 and permitted to stratify into two layers in settling tank 102. The upper hydrocarbon layer may then be withdrawn through line 104 and sent to further refining while the lower aqueous layer is returned as reflux through line 106.

My invention may be further illustrated by the following specific example.

EXAMPLE

To one sample of raw primary hydrocarbon synthesis oil was added sufficient sodium hydroxide in the form of an 11 weight per cent solution to produce a total soap concentration of 20 weight per cent. To a second raw primary oil sample of equal volume was added sufficient sodium hydroxide of the required concentration to produce a total soap concentration of 50 weight per cent in the resultant aqueous layer. After the two samples had been thoroughly agitated and allowed to stratify, the lower layer in each instance was withdrawn and distilled to separate chemicals and solubilized hydrocarbons from the soap. Thereafter each distillate of chemicals and hydrocarbons, the latter being present in the amounts listed below, was distilled up to 100° C. to give a residue consisting predominantly of chemicals and having the hydrocarbon content indicated.

Also, three separate neutral hydrocarbon synthesis oil samples of equal volume and containing only non-acidic chemicals were each countercurrently extracted with an equal volume of a $C_2$ to $C_6$ salt solution. With the first sample a 30 weight per cent $C_2$ to $C_6$ salt solution was used while the second and third samples were extracted with equal volumes of 40 and 50 weight per cent $C_2$ to $C_6$ salt solutions, respectively. Two additional neutral oil samples were batch extracted (equal volumes of salt to oil); the first with a 30.5 weight per cent total soap solution and the second with a 31.2 weight per cent $C_2$ to $C_6$ salt solution. Each of the extracts obtained was treated in a manner identical with that employed in the case of the first-mentioned total soap extractions. The residue obtained in each case from the $C_2$ to $C_6$ salt extract, after the second distillation, contained the bulk of the non-acid oxygenated organic chemicals with minor amounts of hydrocarbons as indicated below.

*Table*

| Material to be Extracted | Soap Conc., Weight Percent | Weight Percent Hydrocarbon in First Distillate | Weight Percent of Feed in Second Distillate to 100° C. | Weight Percent Hydrocarbon | |
|---|---|---|---|---|---|
| | | | | Distillate to 100° C. | Residue |
| Raw Primary Oil | [1] 20 | 11.2 | 44.2 | 17 | 7 |
| Do | [1] 50 | 34.1 | 34.6 | 68 | 16 |
| Neutral Oil | [1] 30.5 | 26 | 40.4 | 49.4 | 11.3 |
| Do | 31.2 | 6.7 | 47.8 | 15.2 | <1 |
| Do | 30 | 6.3 | 48.0 | 11.6 | <1 |
| Do | 40 | 5.8 | 37.5 | 15 | <1 |
| Do | 50 | 23.1 | 32.0 | 56 | 8 |

[1] Total soap employed as extractant.

From the data presented in the above table, it is apparent that numerous advantages are to be gained through the use of a $C_2$ to $C_6$ salt extractant in accordance with the process of my invention. Thus, for a given concentration, the total soap extractant removes from the crude neutral or raw primary synthesis oil a very substantially greater quantity of hydrocarbons, which cannot be removed by a topping operation to a temperature of the order of about 100° C., than is removed by a corresponding concentration of the $C_2$ to $C_6$ salt mixture. For example, with a 50 weight per cent total soap, a final residue of chemicals is secured which contains as much as 16 weight per cent hydrocarbons while with a 50 weight per cent $C_2$ to $C_6$ salt solution, it is possible to obtain a residue of chemicals containing only 8 weight per cent of hydrocarbons. To achieve anything comparable to the latter figure with total soaps, a concentration of about 20 weight per cent must be employed and in so doing a substantial quantity of chemicals is left in the crude synthesis oil raffinate owing to the fact that total soap solutions of such concentration do not have sufficient solvent power therefor. Also, it may be seen that with a 30.5 weight per cent total soap solution, a residue of chemicals having a concentration of hydrocarbons of about 11.3 weight per cent is the best that can be achieved whereas with $C_2$ to $C_6$ salt solutions of 30 weight per cent, 31.2 weight per cent, and 40 weight per cent, a residue representing the bulk of the oil soluble chemicals extracted is obtained containing less than 1 weight per cent of hydrocarbon contamination.

It will be obvious to those skilled in the art to which the present invention relates that numerous modifications in manipulative steps may be made without departing from the scope thereof. In general, it may be said that my invention contemplates the recovery of various oxygenated organic chemicals from hydrocarbon solutions thereof by the use of selected salt fractions of the type herein defined to extract such chemicals and subsequently subjecting the resultant extract to a series of distillation operations to procure the bulk of the chemicals originally dissolved in the oil in a substantially hydrocarbon free condition.

I claim:

1. In a process for the recovery of non-acid oxygenated organic chemicals from hydrocarbon solutions thereof containing fatty acids, the steps which comprise neutralizing the acids present in said solution to obtain a two-phase mixture consisting of an essentially neutral oil layer containing non-acid oxygenated organic chemicals and a lower aqueous phase containing in the form of their corresponding salts essentially all of the acids originally present in said hydrocarbon solution together with minor amounts of solubilized hydrocarbons and non-acid oxygenated organic chemicals, subjecting said neutral oil layer to extraction with a 20 to 50 weight per cent aqueous solution of salts derived from a mixture of aliphatic carboxylic acids having an average molecular weight of from about 85 to about 115, thereafter subjecting the resulting extract to distillation to obtain overhead a fraction comprising said chemicals and a minor amount of hydrocarbons, subjecting said overhead fraction to distillation up to a temperature of from about 90° to about 110° C., collecting an overhead portion therefrom consisting essentially of hydrocarbons, withdrawing a bottoms fraction of oil soluble oxygenated organic chemicals essentially free from hydrocarbons, subjecting said lower aqueous phase to extractive distillation with a solution of aliphatic carboxylic acid salts derived by neutralizing the free acids in said hydrocarbon solution to obtain an overhead comprising hydrocarbons essentially free from chemicals, withdrawing a bottoms fraction comprising said last mentioned carboxylic acid salts rich in chemicals and subjecting said bottoms to distillation to give an overhead containing chemicals and a decreased amount of hydrocarbons, and thereafter fractionating the latter up to a temperature of about 150° C. to obtain a distillate consisting essentially of hydrocarbons and withdrawing a bottoms of organic chemicals substantially free from hydrocarbons.

2. In a process for the recovery of non-acid oxygenated organic chemicals from raw primary hydrocarbon synthesis oil produced simultaneously therewith, the steps which comprise neutralizing the acids in said oil to obtain a two-phase mixture consisting of an essentially neutral oil layer containing non-acid oxygenated organic chemicals and a lower aqueous phase containing in the form of their corresponding salts essentially all of the acids originally present in said hydrocarbon solution together with minor amounts of solubilized hydrocarbons and non-acid oxygenated organic chemicals, subjecting said neutral oil layer to extraction with a 20 to 50 weight per cent aqueous solution of $C_2$ to $C_6$ aliphatic carboxylic acid salts, thereafter subjecting the resulting extract to distillation to obtain overhead a fraction comprising said chemicals and a minor amount of hydrocarbons, subjecting said overhead fraction to further distillation up to a temperature of from about 90° to 110° C., collecting an overhead portion therefrom consisting essentially of hydrocarbons, withdrawing a bottoms fraction of oil soluble oxygenated organic chemicals essentially free from hydrocarbons, subjecting said lower aqueous phase to extractive distillation with a solution of aliphatic carboxylic acid salts derived by neutralizing the free acids in said hydrocarbon solution to obtain an overhead comprising hydrocarbons essentially free from chemicals, withdrawing a bottoms fraction comprising said last mentioned carboxylic acid salts rich in chemicals and subjecting said bottoms to distillation to give an overhead containing chemicals and a decreased amount of hydrocarbons, and thereafter fractionating the latter up to a temperature of about 150° C. to obtain a distillate consisting essentially of hydrocarbons and withdrawing a bottoms of organic chemicals substantially free from hydrocarbons.

3. The process of claim 1 in which the neutral oil layer is extracted with a 30 to 40 weight per cent aqueous solution of $C_2$ to $C_6$ salts derived from fatty acids having an average molecular weight of from about 95 to 105.

4. In a process for the recovery of non-acid oxygenated organic chemicals from hydrocarbon solutions thereof containing fatty acids, the steps which comprise neutralizing the acids present in said solution to obtain a two-phase mixture consisting of an essentially neutral oil layer containing non-acid oxygenated organic chemicals and a lower aqueous phase containing in the form of their corresponding salts essentially all of the acids originally present in said hydrocarbon solution together with minor amounts of solubilized hydrocarbons and non-acid oxygenated organic chemicals, subjecting said neutral oil layer to extraction with a 30 to 40 weight per cent aqueous solution of aliphatic salts derived from a mixture of carboxylic acids having an average molecular weight of 95 to 105, thereafter subjecting the resulting extract to distillation to obtain overhead a fraction comprising said chemicals and a minor amount of hydrocarbons, subjecting said overhead fraction to distillation up to a temperature of from about 100° to about 105° C., collecting an overhead portion therefrom consisting essentially of hydrocarbons, withdrawing a bottoms fraction of oil soluble oxygenated organic chemicals essentially free from hydrocarbons, subjecting said lower aqueous phase to extractive distillation with a solution of aliphatic carboxylic acid salts derived by neutralizing the free acids in said hydrocarbon solution to obtain an overhead comprising hydrocarbons essentially free from chemicals, withdrawing a bottoms fraction comprising said last mentioned carboxylic acid salts rich in chemicals and subjecting said bottoms to distillation to give an overhead containing chemicals and a decreased amount of hydrocarbons, and thereafter fractionating the latter up to a temperature of about 150° C. to obtain a distillate consisting essentially of hydrocarbons and withdrawing a bottoms of organic chemicals substantially free from hydrocarbons.

5. In a process for the recovery of non-acid oxygenated organic chemicals from hydrocarbon solutions thereof, the steps which comprise extracting said solution with a 20 to 50 weight per cent aqueous solution of salts derived from a mixture of $C_2$ to $C_6$ fatty acids having an average molecular weight of from 85 to about 115, thereafter subjecting the resulting extract to distillation to obtain overhead a fraction comprising said chemicals and a minor amount of hydrocarbons, subjecting said overhead fraction to distillation up to a temperature of from about 90° to 110° C., collecting an overhead portion therefrom consisting essentially of hydrocarbons, and withdrawing a bottoms fraction of oil soluble oxygenated organic chemicals essentially free from hydrocarbons.

6. In a process for the recovery of non-acid oxygenated organic chemicals from hydrocarbon solutions thereof, the steps which comprise extracting said solution with a 30 to 40 weight per cent aqueous solution of $C_2$ to $C_6$ aliphatic carboxylic acid salts, thereafter subjecting the resulting extract to distillation to obtain overhead a fraction comprising said chemicals and a minor amount of hydrocarbons, subjecting said overhead fraction to distillation up to a temperature of from about 100° to 105° C., collecting an overhead portion therefrom consisting essentially of hydrocarbons, and withdrawing a bottoms fraction of oil soluble oxygenated organic chemicals essentially free from hydrocarbons.

7. In a process for the recovery of non-acid oxygenated organic chemicals from raw primary hydrocarbon synthesis oil produced simultaneously therewith, the steps which comprise extracting said oil with a 20 to 50 weight per cent aqueous solution of salts derived from a mixture of fatty acids having an average molecular weight of from 85 to about 115, thereafter subjecting the resulting extract to distillation to obtain overhead a fraction comprising said chemicals and a minor amount of hydrocarbons, subjecting said overhead fraction to distillation up to a temperature of from about 90° to 110° C., collecting an overhead portion therefrom consisting essentially of hydrocarbons, and withdrawing a bottoms fraction of oil soluble oxygenated organic chemicals essentially free from hydrocarbons.

8. In a process for the recovery of non-acid oxygenated organic chemicals from raw primary hydrocarbon synthesis oil produced simultaneously therewith and which involves neutralizing the acids present in said oil to obtain a two-phase mixture consisting of an essentially neutral oil layer containing non-acid oxygenated organic chemicals and a lower aqueous phase containing in the form of their corresponding salts essentially all of the acids originally present in said raw primary oil together with minor amounts of solubilized hydrocarbons and non-acid oxygenated organic chemicals, the steps which comprise subjecting said lower aqueous phase to extractive distillation with a solution of aliphatic carboxylic acid salts derived by neutralizing the free acids in said hydrocarbon solution to obtain an overhead comprising hydrocarbons essentially free from chemicals, withdrawing a bottoms fraction comprising said last mentioned carboxylic acid salts rich in chemicals and subjecting said bottoms to distillation to give an overhead containing chemicals and a decreased amount of hydrocarbons, and thereafter fractionating up to a temperature of about 150° C. said overhead containing chemicals and a decreased amount of hydrocarbons to obtain a distillate consisting essentially of hydrocarbons, and withdrawing a bottoms of oxygenated organic chemicals substantially free from hydrocarbons.

FRANK G. PEARCE.

References Cited in the file of this patent

UNITED STATES PATENTS

| Number | Name | Date |
|--------|------|------|
| 2,258,500 | Mertens | Oct. 7, 1941 |
| 2,274,750 | Soenksen et al. | Mar. 3, 1942 |
| 2,535,070 | Walker et al. | Dec. 26, 1950 |

OTHER REFERENCES

Koch: Bunnstaff-chemie, vol. 16, No. 20, pages 382–7 (1935).

Fischer: Conversion of Coal into Oils, pub. by Ernest Benn, Ltd., London (1925), pages 241–246.

Fieser et al.: Organic Chemistry, pub. by Heath, Boston (1944), pp. 206–9.

U. S. Naval Technical Mission in Europe, October 1945, pages 1, 73 and 80 to 88.